United States Patent [19]

Yanai et al.

[11] Patent Number: 4,806,923

[45] Date of Patent: Feb. 21, 1989

[54] MINIATURIZED ELECTRONIC APPARATUS

[75] Inventors: Tsuguo Yanai; Yukio Inagaki; Shoji Matsuo; Hidetaka Fujisawa, all of Tokyo, Japan

[73] Assignee: Casio Computer Co., Ltd., Tokyo, Japan

[21] Appl. No.: 841,900

[22] Filed: Mar. 20, 1986

[30] Foreign Application Priority Data

Mar. 27, 1985 [JP] Japan .................................. 60-62333
Nov. 22, 1985 [JP] Japan .................................. 60-263026

[51] Int. Cl.⁴ .............................................. G06F 3/14
[52] U.S. Cl. .................................. 340/784; 340/765; 340/800
[58] Field of Search ............... 340/784, 765, 800, 801, 340/811, 805; 350/332, 336; 364/707

[56] References Cited

U.S. PATENT DOCUMENTS

| | | | |
|---|---|---|---|
| 3,815,354 | 6/1974 | Strocka et al. | 340/811 |
| 3,938,318 | 2/1976 | Collins | 340/811 |
| 4,060,802 | 11/1977 | Matsuki | 340/811 |
| 4,113,361 | 9/1978 | Nakano | 340/800 |
| 4,206,459 | 6/1980 | Houryu et al. | 340/765 |
| 4,227,193 | 10/1980 | Shanks | 340/811 |
| 4,393,379 | 7/1983 | Berting et al. | 340/784 |
| 4,583,092 | 4/1986 | Saito | 340/711 |

Primary Examiner—John W. Caldwell, Sr.
Assistant Examiner—Alvin Oberley
Attorney, Agent, or Firm—Frishauf, Holtz, Goodman & Woodward

[57] ABSTRACT

An electronic apparatus has a solar battery and a liquid crystal display unit for displaying a plurality of digits. A plurality of column electrodes are provided for each digit, and a plurality of common electrodes are provided for all the digits. A regulator receives and stabilizes the output voltage of the solar battery. A pulse generator generates a clock pulse signal. It is an oscillator with CMOS structure to permit implementation as a LSI. A CPU is driven by the stabilized voltage and the clock pulse signal to provide data to be displayed on the display unit. A liquid crystal driver circuit applies common signals, which can assume two different voltage levels and have a waveform with the logic level thereof inverted for every one held cycle period, to the common electrodes. The driver circuit applied column signals of either one of the two voltage levels corresponding to the display data to the column electrodes. Voltages corresponding to differences between the segment signals and common signals are applied across the liquid crystal of the display unit, whereby the display unit is driven by a multi-static system. The regulator, CPU and liquid crystal driver circuit are assembled in a single chip LSI.

10 Claims, 18 Drawing Sheets

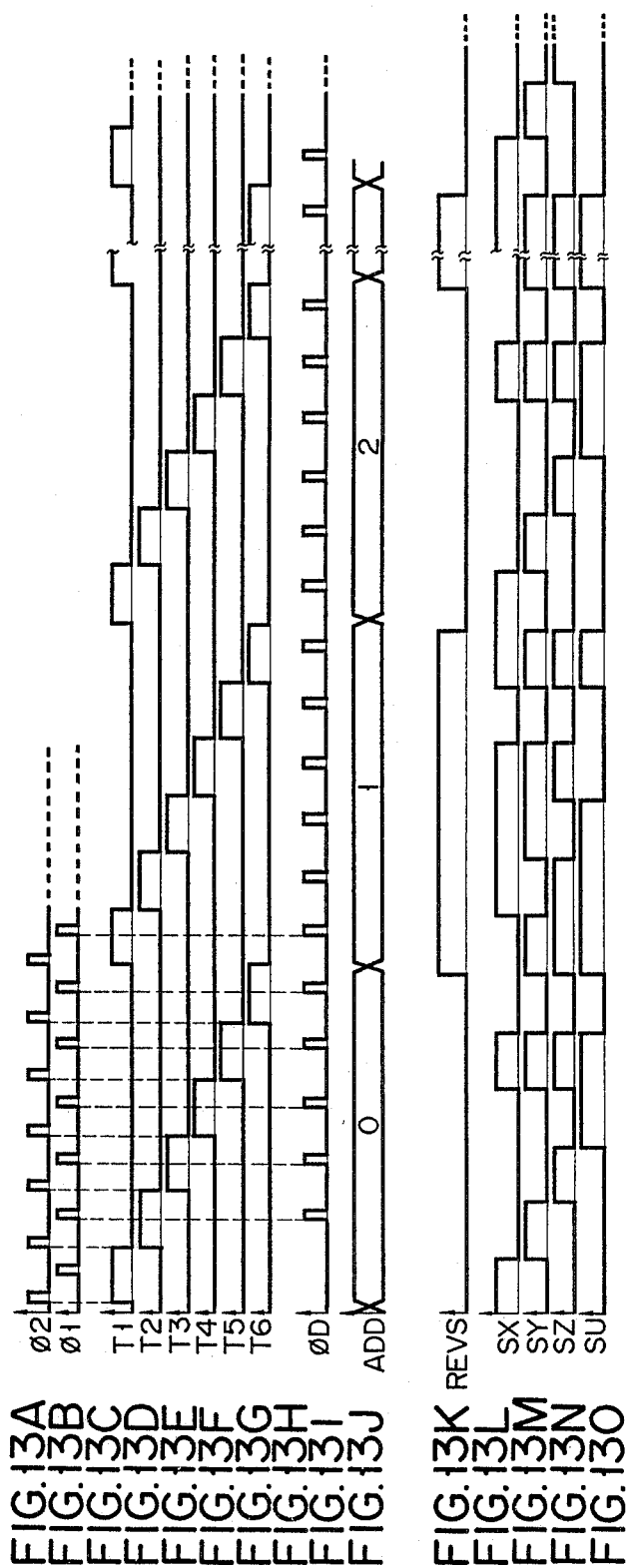

MINIATURIZED ELECTRONIC APPARATUS

BACKGROUND OF THE INVENTION

This invention relates to improvements in a miniaturized electronic apparatus using a solar battery as a power source and having a liquid crystal display unit.

A miniaturized electronic apparatus, e.g., an electronic calculator or timepiece, which uses a solar battery and has a liquid crystal display unit, is well known in the art. Such a miniaturized electronic apparatus requires a large number of external components, in addition to the solar battery and liquid crystal display unit, such as a printed circuit board connecting the battery and display unit, and LSI. The external components further include diodes for source voltage regulation, capacitors for stepping up voltage to the liquid crystal, resistors for a pulse generator and capacitors for power source protection. The use of these external components increases the price of the miniaturized electronic apparatus. Further, since a large number of components are involved, it is difficult for an automatic assembling apparatus to assembly the electronic apparatus.

The liquid crystal display unit is usually driven by either a static drive system or a time-sharing drive system. When the static drive system is used, the liquid crystal display unit must have a large number of connection terminals and consumes much power. The miniaturized electronic apparatus using a solar battery as power source can not be driven by the static drive system, because of low power-generation capacity of the solar battery. When the time-sharing drive system is used, flicker of the display is liable to result. In addition, when this system is used, three or four different voltages must be applied to segment electrodes. This requires circuit exclusively for generating these voltages. Hence, the time-sharing drive system needs to have a complicated driver circuit.

SUMMARY OF THE INVENTION

An object of the invention is to simplify the construction of the miniaturized electronic apparatus using a solar battery and having a liquid crystal display unit, and to provide a more reliable miniaturized electronic apparatus.

A further object of the present invention is to provide an electronic apparatus which there is no flicker of the display, and which has a low power consumption.

According to the invention, there is provided a liquid crystal display apparatus for providing a visible display in accordance with display data, comprising:

a liquid crystal display panel having at least one plural digit liquid crystal display unit, said at least one liquid crystal display unit including column electrodes arranged in a plurality of separate signal lines for each digit, and common electrodes arranged in a plurality of separate signal lines which are common for all of said digits;

a circuit for applying common signal to said common electrodes, said common signals having two different voltage levels and a cyclic waveform having first and second half cycles, the first half of each cycle of said common signal being opposite in phase to the second half of the same cycle of said cyclic waveform; and a circuit for applying column signals to said column electrodes in correspondence to display data to provide a display thereof, said column signals having two different voltage levels and a cyclic waveform having first and second half cycles, the first half of each cycle of said column signal being opposite in phase to the second half of the same cycle of the cyclic waveform of said column signals, said column signals determining a lighting pattern of segments of said column electrodes on the basis of the display data;

said circuit for applying said column signals including:

a memory means for storing said display data;

a transforming circuit for transforming said display data into digital data corresponding to an "on-off" display pattern of segments on said column lines;

shift registers for storing said digital data, each of which has a number of bits corresponding to half of the cycle of said column signal and which are each provided for a respective one of said column electrodes, said shift registers each storing waveform data of the column signal to be applied to the corresponding column electrode;

an inverter for inverting data read out from said shift register;

a circuit for re-entering said inverted data into said shift register; and a circuit for generating voltages for reading out digital data from said storing means and for supplying voltages having two different levels corresponding to said digital data to said column electrodes.

BRIEF DESCRIPTION OF THE DRAWINGS

FIG. 13A to 13O are waveform diagrams showing signal waveforms for explaining the operation of the circuit shown in FIGS. 12A and 12B.

DETAILED DESCRIPTION OF THE PREFERRED EMBODIMENTS

Now, one embodiment of the invention applied to a miniaturized electronic apparatus such as a miniaturized electronic calculator or timepiece will be described with reference to the drawings.

Figure 1:
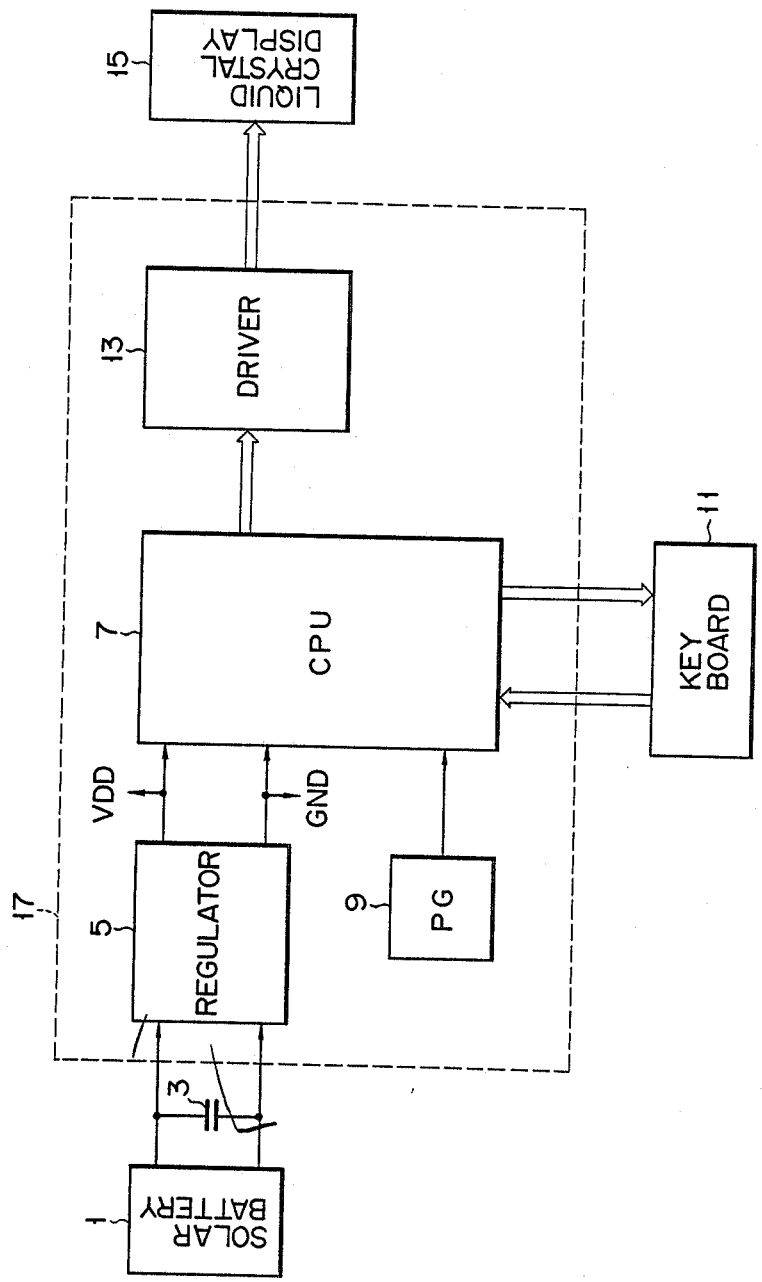
FIG. 1 is a block diagram showing an embodiment of the miniaturized electronic apparatus according to the invention.

Referring to FIG. 1, there is shown the circuit construction of a miniaturized electronic apparatus embodying the invention. The output voltage of solar battery 1 is fed to regulator 5 through capacitor 3 connected in parallel with solar battery 1. Regulator 5 stabilizes the output voltage of solar battery 1 and provides a stabilized voltage which is applied to CPU 7 and other circuits. CPU (Central Processing Unit) 7 operates with the output voltage of regulator 5 and clock pulses provided from pulse generator (hereinafter referred to as PG) 9. CPU 7 provides a key sampling signal which is fed to, for instance, keyboard 11. CPU 7 supplies display data to liquid crystal driver cricuit 13 according to the results of internal operations or in response to a key operation. Further, CPU 7 executes various control operations according to operation data provided from keyboard 11.

Regulator 5, CPU 7, PG 9 and liquid crystal driver circuit 13 are formed in LSI 17 consisting of a single chip.

Figure 2:
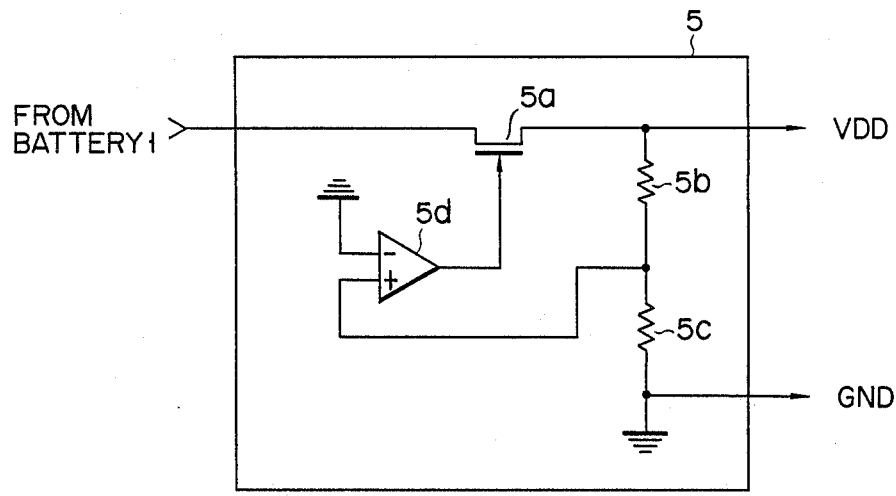
FIG. 2 is a circuit diagram showing an example of regulator shown in FIG. 1.

The construction of regulator 5 will now be described with reference to FIG. 2. The plus side output terminal of solar battery 1 is connected to the source of FET 5a. The drain of FET 5a is connected to one terminal of resistor 5b and also to power input terminals of CPU 7 and other parts. The other terminal of resistor 5b is connected to one terminal of resistor 5c, the other terminal of which is grounded. The connection point between resistors 5b and 5c is connected to a plus side input terminal of comparator 5d. A minus side input terminal of comparator 5d is grounded. The output terminal of comparator 5d is connected to the gate of FET 5a. Comparator 5d controls the flow of current between the source and drain of FET 5a according to output voltage VDD of regulator 5. The output voltage VDD thus is stabilized to, for instance, 5 V.

Figure 3:
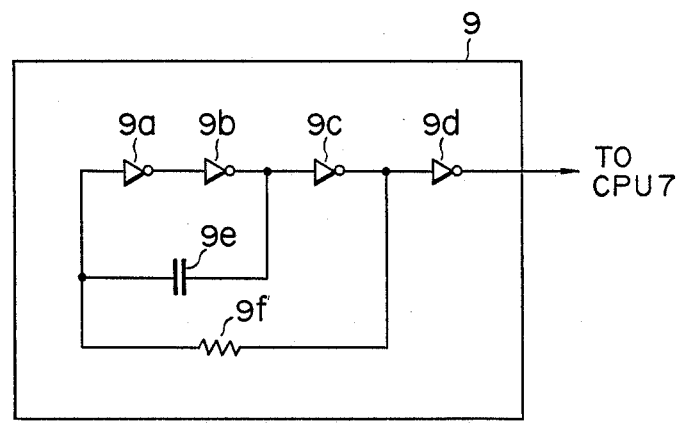
FIG. 3 is a circuit diagram showing part of the pulse generator shown in FIG. 1.

The construction of PG 9 will now be described with reference to FIG. 3. PG 9 is formed within LSI 17, so that a circuit without using any coil, for example, a pulse generator circuit with CMOS structure is employed. Four inverters 9a to 9d are connected in series. Capacitor 9e is connected in parllel with the series combination of inverters 9a and 9b. Resistor 9f is connected in parallel with the series combination of inverters 9a to 9c. The output terminal of inverter 9d, which is the last one of series inverters 9a to 9d, is connected as output terminal of PG 9 to CPU 7 to supply clock pulses.

Liquid crystal display unit 15 will now be described with reference to FIGS. 4A to 4C. Liquid crystal display unit 15 as shown in FIG. 4A has figure eight segments a to f and h, symbol segment g and decimal point segment i for each digit. Unit of segments a to i is defined as a display unit. For example, in a 8-digit display case, eight display units as shown in FIG. 4A are arranged in a row. Each display unit has the following structure. On the one, for example, upper transparent sheet, segment electrodes a to i are connected by predetermined pattern and form column electrodes A, B and C, as shown in FIG. 4B. Of the segment electrodes formed on the one transparent sheet segment electrodes c, f and i are connected in common and form column electrode A, segment electrodes b, e and h are connected in common and form column electrode B, and segment electrodes a, d and g are connected in common and form column electrode C.

Figure 4C:
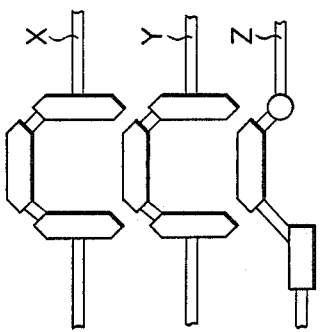
FIGS. 4A to 4C are circuit diagrams showing the structure of a display part of a liquid crystal display unit shown in FIG. 1.
Figure 4B:
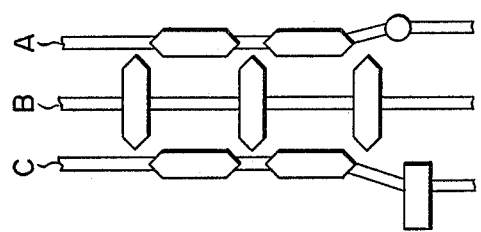
Figure 4A:
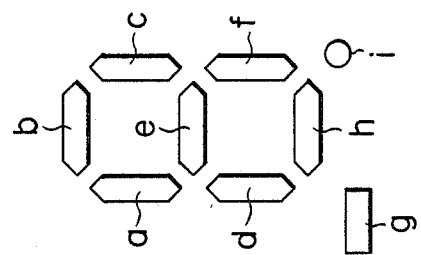

On the other, for example, lower transparent sheet, common electrodes X, Y and Z which are common to the individual digits are formed, as shown in FIG. 4C. Of the segment electrodes formed on this transparent sheet, segment electrodes a to c corresponds to common electrode X, segment electrodes d to f corresponds to common electrode Y, and segment electrodes a, d and g corresponds to common electrode Z.

A liquid crystal material fills the space between the two transparent sheets noted above. A voltage corresponding to the difference between signal voltages applied to segment electrodes which face each other via the liquid crystal material is applied across the liquid crystal material, whereby the liquid crystal material is driven. A character is displayed as a given combination of "on" and "off" segments of each display unit.

Figure 5A:
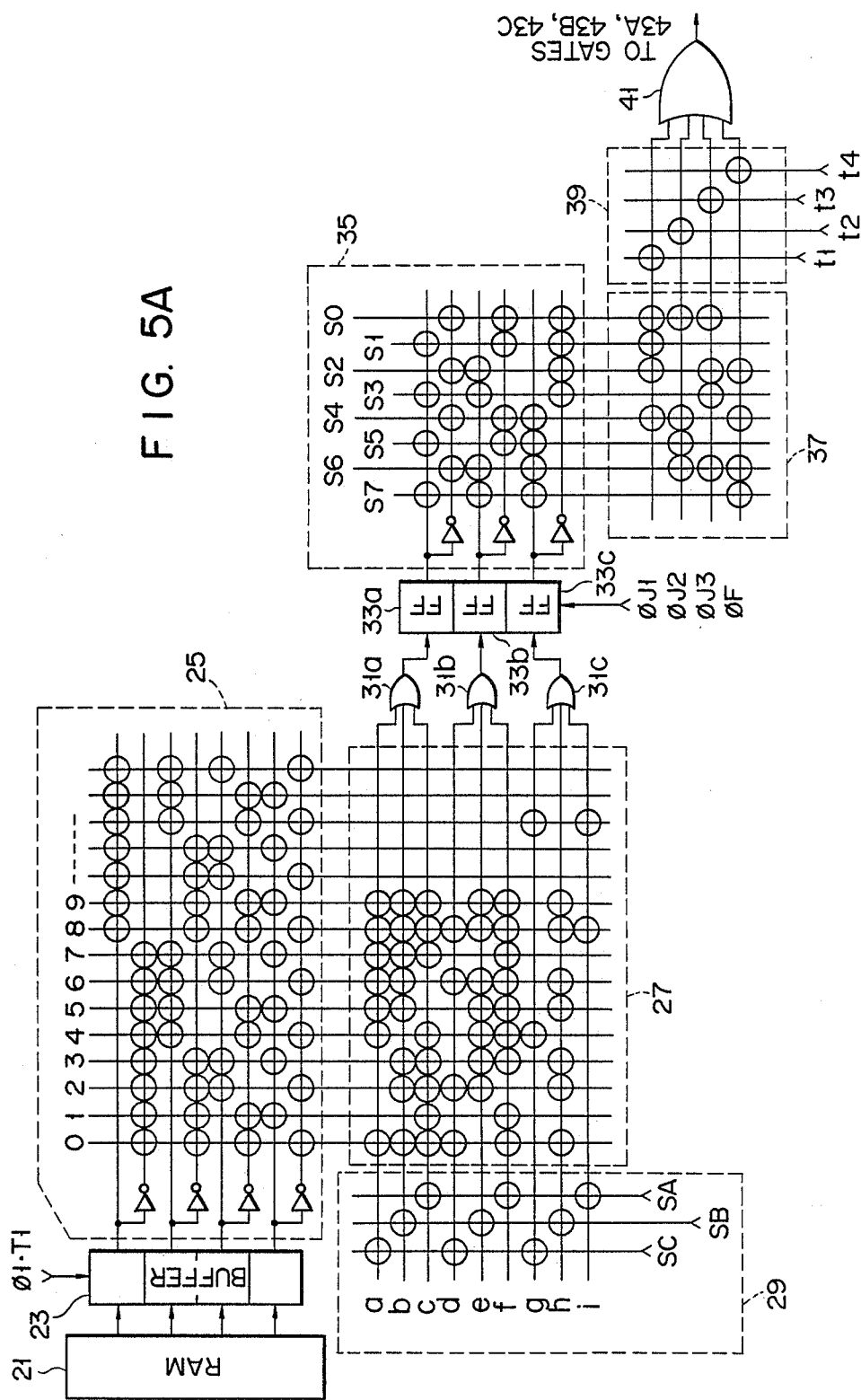
FIGS. 5A, 5B and 6 are circuit diagrams showing an example of liquid crystal drive circuit shown in FIG. 1.
Figure 5B:
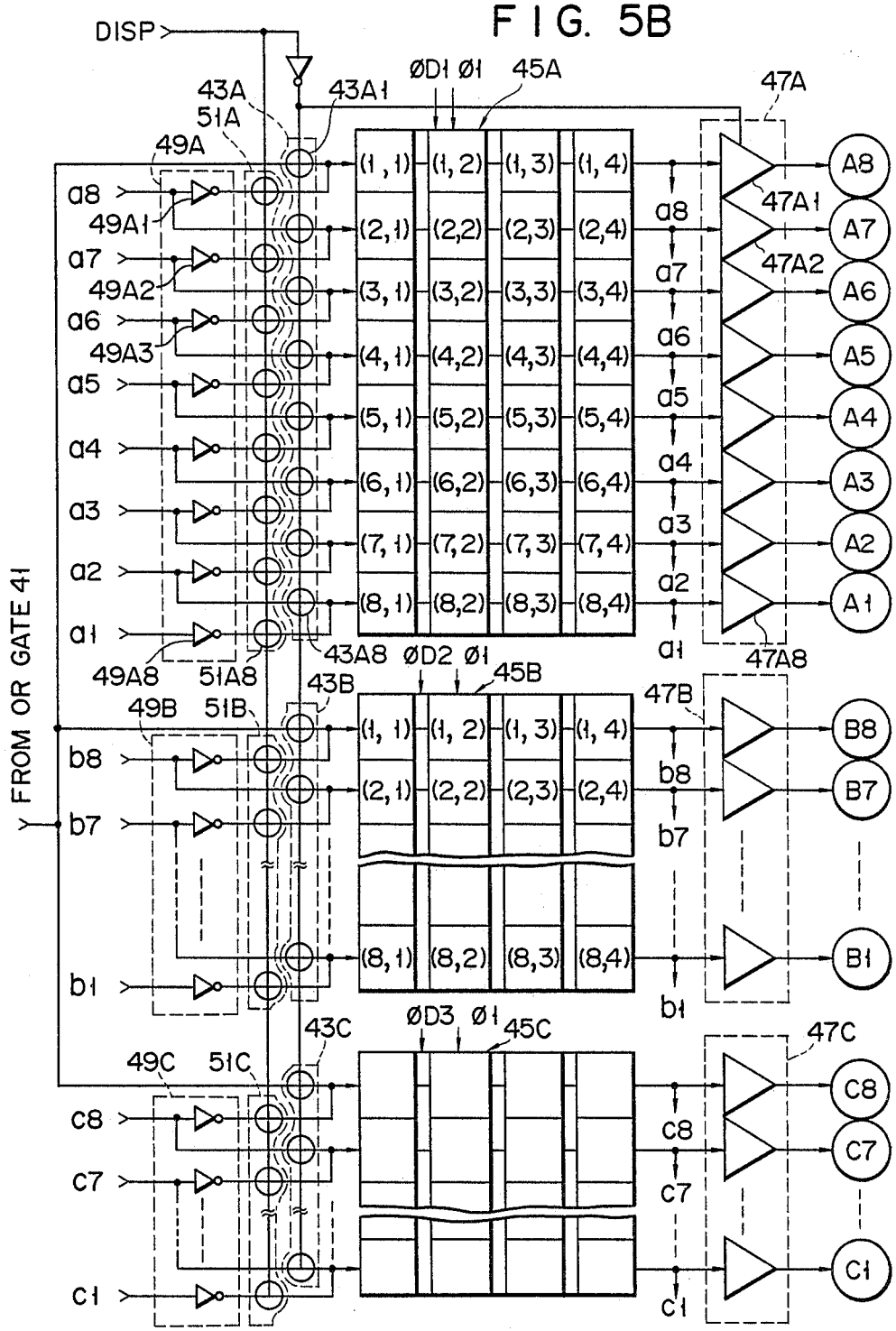
Figure 6:
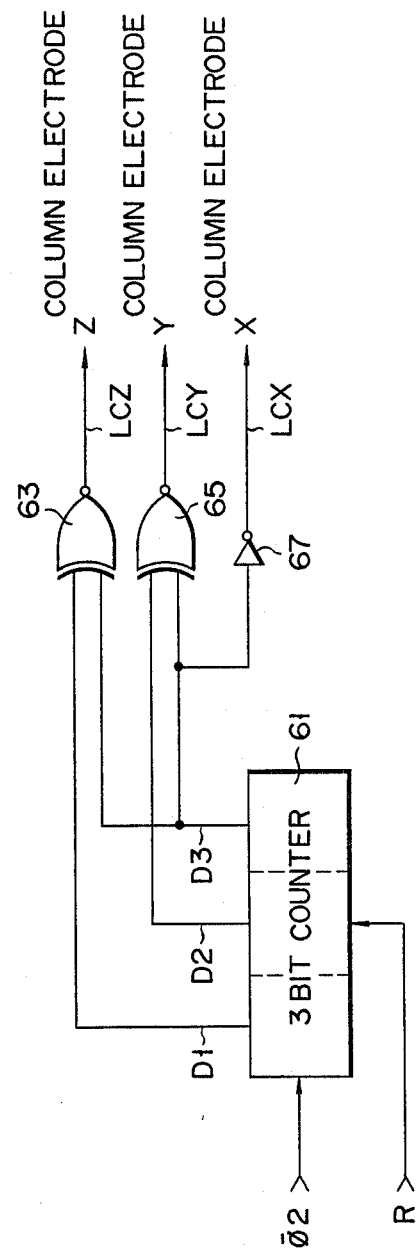

Liquid crystal driver circuit 13 will now be described with reference to FIGS. 5A, 5B and 6.

First, a circuit for driving column electrodes A, B and C will be described with reference to FIGS. 5A and 5B. Display data from CPU 7 is stored in RAM 21. Display data is provided for each display digit from CPU 7 to be temporarily stored in buffer register 23 consisting of, for instance, 4 bits. Buffer register 23 reads in the stored data in synchronism to clock pulse signals $\phi 1$ and T1. Data provided is fed to decocer 25. Decoder 25 decodes input data, which is binary data, to activate one of output signal lines.

The output signal from decoder 25 is fed to a segment converter circuit 27. Converter circuit 27 selects segments which are necessary for the display of display data noted above on display unit 15. For example, when display data represents "2", segments b, c, e, d and h are selected. Converter circuit 27 provides segment selection signals corresponding to the selected segments. Specifically, converter circuit 27 activates signal lines corresponding to the selected segments.

Segment control circuit 29 is connected to segment converter circuit 27. Control circuit 29 receives timing signals SA, SB and SC to be described later. Control circuit 29 selectively provides either voltage on the signal lines corresponding to segments a, d and g, voltage on the signal lines corresponding to the segments b, e and h and voltage on the signal lines for segments c, f and i according to timing signals SA, SB and SC. In other words, control circuit 29 provides signals in signal lines corresponding to segments corresponding to the same column electrodes according to control signals SA, SB and SC. Selected signals corresponding to segments a to c are fed to OR gate 31a. Selected signals corresponding to segments d to f are fed to OR gate 31b. Selected signals corresponding to segments g to i are fed to OR gate 31c.

The output signal of OR gate 31a is fed to flipflop (hereinunder referred to as FF) 33a to be stored in FF 33a in synchronism to clock pulse signal $\phi J1$. The output signal of OR gate 31b is stored in FF 33b in synchronism to clock pulse signal $\phi J2$. The output signal of OR gate 33c is stored in FF 33c in synchronism to clock pulse signal $\phi J3$. FFs 33a to 33c feed data held in them simultaneously to decoder 35 in synchronism to clock $\phi F$. Decoder 35 decoders output data of FF 33a to 33c. A voltage level of signal line corresponding to the result of decoding is made an active level. Each signal line corresponds to a column signal (S0 to S7) to be described later, so the signal lines are labeled S0 to S7. Thus, a signal representing a combination of segments to be displayed is obtained for each column electrode. For example, it is assumed that a segment connected to column electrode X is to be displayed, while segments connected to common electrodes Y and Z are not displayed. In this case, data "1" is stored in FF 33a, while data "0" is stored in FFs 33b and 33c. Decoder 35 makes the voltage on signal line S7 to be of the active level.

The output of decoder 35 is fed to encoder 37. Encoder 37 encodes the input signal according to a predetermined logic into 4-bit parallel data. The predetermined logic noted above corresponds to the waveform of a signal applied to the column electrodes according to the combination of segments to be displayed. This parallel data is fed to timing control circuit 39. Timing control circuit 39 provides the parallel data noted above at different timings according to timing signals "t1 to t4" to be described later. The 4-bit parallel data which are provided at different timings are fed to 4-input OR gate 41. OR gate 41 converts the parallel data into serial data.

The output of OR gate 41 is provided to gate circuits 43A to 43C. Gate circuits 43A to 43C are "on" when control signal DISP is at "L" level (input signal is at "H" level), while they are "off" when the signal is at "H" level (input signal is at "L" level). Hold circuits 45A to 45C hold data (generated from encoder 37) which correspond to the signal waveforms of column signals applied to column electrodes A1 to A8, B1 to B8 and C1 to C8 of the available number of digits (eight digits in this embodiment). Holder circuits 45A to 45C each consist of 8 rows for the respective display digits. That is, hold circuits 45A to 45C each consist of FFs arranged in a 8-row 4-column matrix array. The construction of hold circuits 45B and 45C and associated peripheral circuits are the same as the construction of hold circuit 45A and associated peripheral circuit. Therefore, only hold circuit 45A and associated peripheral circuit will be described in detail.

The output signal of OR gate 41 is fed through gate 43A1 to FF(1,1) in 1st row and 1st column of hold circuit 45A. The output of FF(i,1) (i=1, 2, ..., 8) in the 1st column of hold circuit 45A is fed to FF(i,2) in the 2nd column. The output of FF(i,2) in the 2nd column is fed to FF(i,3) in the 3rd column. The output of 3rd column FF(i,3). The output of the 3rd column FF(i,3) is fed to 4th column FF(i,4). The output of the 4th FF(i,4) is fed to driver 47A. The operation of driver 47 is controlled by signal DISP to be described later.

The output of 4th FF(i,4) is fed to 1st column FF(i+1,1) in the next lower row through gate 43A-(i+1). Similarly, the data is shifted as follows: FF(i+1,2)→FF(i+1,3)→FF(i+1,4)→gate 43A-(i+2)→FF(i+2,1)→... →FF(8,4). And when signal DISP is at "H" level, the output data of 4th column FF(i,4) is fed to 1st column FF(i,1) through inverter 49Ai and gate 51Ai. The FFs constituting hold circuit 45A are operated according to clocks $\phi$D1 and $\phi$1.

The output signal of OR gate 41 is fed to hold circuit 45B as well through date circuit 43B. The output of hold circuit 45B is fed to driver 47B, the output of which is fed to corresponding column electrodes B.

The output of hold circuit 45B is fed to 1st column FF in the next lower row through gate circuit 43B. The output of hold circuit 45B is fed to 1st column FF through inverter circuit 49B and gate circuit 51B. the FFs constituting hold circuit 45B are operated according to clocks $\phi$D2 and $\phi$1. Similarly, for hold circuit 45C the output signal of OR gate 41 is fed to gate circuit 43C. The output of hold circuit 45C is fed to driver 47C, the output of which is fed to corresponding column electrodes. The output of hold circuit 45C is fed to 1st column FF in the next lower row through gate circuit 43C. The output of hold circuit 45C is fed to 1st column FF in the same row through inverter circuit 49C and gate circuit 51C. The FFs constituting hold circuit 45C are operated according to clocks $\phi$D2 and $\phi$1.

Now, the construction of the circuit for driving the common electrodes will be described with reference to FIG. 6. 3-bit binary counter 61 counts clock pulses 2. Clock pulse signal $\phi$2 is deviated in phase by from clock pulse signal $\phi$1, and the inversion of clock pulse signal $\phi$2 is clock pulse signal $\overline{\phi2}$. Counter 61 is reset by reset signal R provided from CPU 7. 1st bit "D1" of the output data of counter 61 is fed to EX NOR gate 63. 2nd bit "D2" of the output data of counter 61 is fed to EX NOR gate 65. 3rd bit "D3" of the output data of counter 61 is fed to EX NOR gates 63 and 65 and also to inverter 67. The output of EX NOR gate 63 is fed as common signal LCZ to common electrode Z. The output of EX NR gate 65 is fed as common signal LCY to common electrode Y. The output of inverter 67 is fed as common signal LCX to common electrode X.

The operation of the miniaturized electronic apparatus having the above construction will now be described. When solar battery 1 is irradiated by external light, it generates power. Its output voltage is fed to regulator 5. The output voltage of solar battery 1 varies with the illumination intensity of external light. Regulator 5, however supplies a fixed voltage to CPU 7 and other parts of the system. CPU 7 operates by using output clock pulses of PG 9 as reference clock and performs control operations according to a key operation in keyboard 11. In this case, When numerical data is fed from keyboard 11 to it, CPU 7 provides this numerical data as data for display on liquid crystal display unit 15 to liquid crystal driver circuit 13. When data to be processed is fed, it provides numerical data as a result of the processing as the display data to circuit 13.

Figure 7:
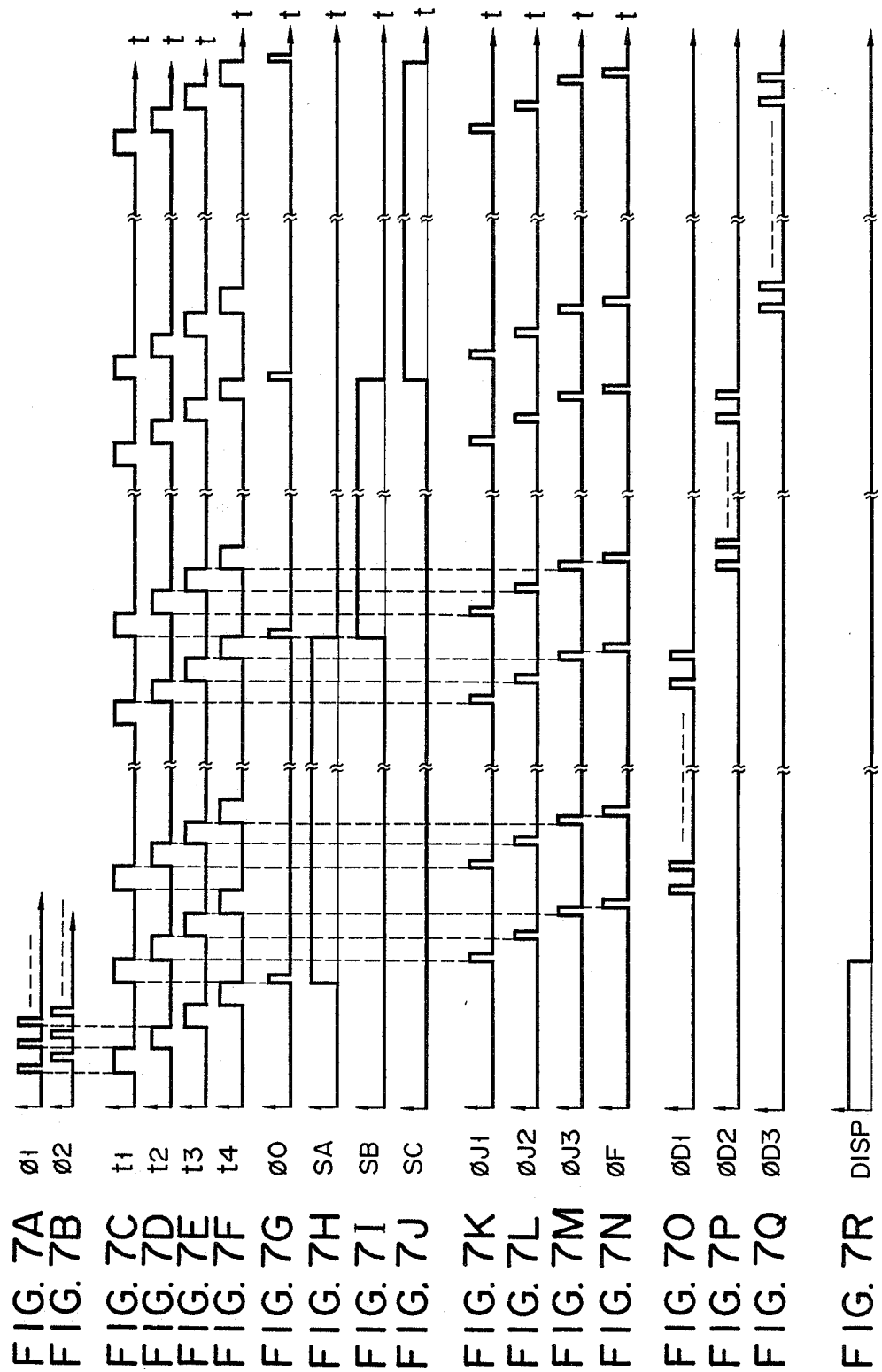
FIGS. 7A to 7R and 8A to 8G are waveform diagrams showing the operation of the liquid crystal driver circuit.

The operation of liquid crystal driver circuit 13 will now be described with reference to FIGS. 7A to 7R and 8A to 8G. FIG. 7A shows the waveform of signal $\phi$1 provided from CPU 7. FIG. 7B shows the waveform of clock pulse signal $\phi$2 provided from CPU 7. Clock pulse signal $\phi$2 is different in phase by $\pi$ from clock pulse signal $\phi$1. FIGS. 7C to 7F show the waveforms of signals t1 to t4, respectively, supplied to timing control circuit 39. Signals t1 to t4 are successively provided in synchronism to the rise of clock pulse $\phi$1. FIG. 7G shows the waveform of pulse signal $\phi$0 which is provided when reading out data in RAM 21. Signal $\phi$0 is provided every time display data for the number of display digits (8 digits in this embodiment) from RAM 21. FIGS. 7H to 7J show the waveforms of timing signals SA, SB and SC fed to control circuit 29. The signals SA, SB and SC are provided in synchronism to clock $\phi$0. FIGS. 7K to 7N show the waveforms of clock pulse signals $\phi$J1 to $\phi$F supplied form FF 33a to 33c. FIGS. 7O to 7Q show the waveforms of clock signals $\phi$D1 to $\phi$D3 fed to hold circuits 45A to 45C. FIG. 7R shows the waveform of display control signal DISP provided from CPU 7.

In this embodiment, the process of driving liquid crystal display unit 15 consists of a step of storing data corresponding to signals applied to column electrodes in hold circuits 45A to 45C and a step of applying actually applying signal to column electrodes according to data stored in hold circuits 45A to 45C.

First, the step of storing data in hold circuits 45A to 45C will be described. CPU 7 renders control signal DISP to "L" level. Driver 47 is disabled. Therefore, liquid crystal display unit 15 is not driven. 1st bit of display data from RAM 21 is read into buffer 23 under the control of CPU 7. Data from buffer 23 is fed to decoder 25. The data is decoded to be fed to segment conversion circuit 27. Segment conversion circuit 27 selects segments necessary for the display of 1st digit display data according to data from decoder 25. Conversion circuit 27 rendered voltage on the signal lines corresponding to the selected segments to be "H" level. At this time, timing signal SA is at "H" level. Voltage on the signal lines corresponding to segments c, f and i are thus fed to OR gates 31a to 31c, and the voltage levels on these signal lines output from OR gates 31a to 31c. FFs 33a to 33c latch data from OR gates 31a to 31c in synchronism to clock pulses φJ1 to φJ3. FFs 33a to 33c feed held data to decoder 35 according to clock φF. Decoder 35 decodes input data and feeds decoded data to encoder 37. Encoder 37 encodes the data from decoder 35 according to a predetermined logic. The encoded data are provided from at different timings according to timing signals t1 to t4 from timing control circuit 39. The output of conversion circuit 37 is fed to OR gate 41. OR gate 41 converts input data into serial data. Serial data from OR gate 41 is fed to hold circuits 45A to 45C through gate circuits 43A to 43C. Control signal DISP is at "L" level, and gate circuits 43A to 43C are "on" while gate circuits 51A to 51C are "off". Of clock pulse signals φD1 to φD3 for operating hold circuits 45A to 45C, only clock pulse signal φD1 is provided. Therefore, output data of OR gate 41 is fed to FF(1,1) in hold circuit 45A. Subsequently, 4-bit data corresponding to the 1st digit display data are succeedingly fed to 1st row FFs(1,i). Then, 2nd digit display data is supplied to buffer 23. Similar operation is succeedingly performed, whereby data necessary for the display of segments connected to column electrode A for the 2nd digit are successively fed to hold circuit 45A. Subsequently, display data is read out successively for a predetermined number of digits. Data necessary for the display of these digits are unidirectionally shifted to be held in all the FFs in hold circuit 45A according to clock pulse signals φD1 and φ1.

When display data is read out from RAM 21 for eight digits, signal SA goes to "L" level, so that clock pulse φ0 is provided. Signal SB goes to "H" level in synchronism to pulse φ0. 1st bit of display data is read out to be decoder in decoder 25 and encoded in conversion circuit 27. Single signal SB is "H" level, the signals corresponding to segment electrodes b, e, and h are stored in FFs 33a to 33b. The data stored in FFs 33a to 33c are provided to decoder 35. The output data is decoded and encoded in encoder 37 into 4-bit data corresponding to the result of decoding. This data is converted into serial data by timing control circuit 39 and OR gate 41. The serial data is fed through gate circuits 43A to 43C to hold circuits 45A to 45C. Signal DiSP is at "L" level, data circuits 43A to 43C are "on", and gate circuits 51A to 51C are "off". Meanwhile, of clock pulses φD1 to φD3, clock pulse φD2 for operating hold circuit 45B is provided. Therefore, data from OR gate 41 is stored in hold circuit 45B. Similar operations are also subsequently performed for 2nd, 3rd and so forth bits of display data. Data for hold circuit 45B thus are successively supplied. Input data to hold circuit 45B is shifted according to clocks φD2 and φ1. Finally, data corresponding to signal to be applied to column electrode B for each digit is unidirectionally shifted through and held in hold circuit 45B.

When display dat for 8 digits have been read out from RAM 21, signal SB goes to "L" level, and signal SC goes to "H" level. 1st bit of display data is read out from RAM 21 to be decoder and encoded. In this case, the signals corresponding to segments a, d and g are stored in FFs 33a to 33c according to signal SC. The data stored in FFs 33a to 33c are decoder in decoder 35 and then encoded in encoder 37 before being converted into serial signal by timing control circuit 39 and OR gate 41. The serial data from OR gate 41 is fed through gate circuits 43A to 43C to hold circuits 45A to 45C. Since only clock pulse φD3 for operating hold circuit 45C is provided, the output data of OR gate 41 is stored in hold circuit 45C. Finally, data for eight digits are unidirectionally shifted through and held in all the FFs of hold circuit 45C according to clock pulses φD3 and φ1, thus bringing an end to the process of storing data in the hold circuits.

Now, the process of applying predetermined signals to the column electrodes will be described. Signal DISP is inverted to "H" level by CPU 7. As a result, driver 47 is enabled. The data held in hold circuits 45A to 45C are fed to driver 47 in synchronism to signal φ1. Driver 47 applies signals at levels corresponding to input data to column electrodes A1 to A8, B1 to B8 and C1 to C8. For example, when data "1" is fed to driver 47, a voltage of 5V is applied to the column electrodes. When data "0" is fed, on the other hand, the ground voltage is applied to the column electrodes. The data read out from the hold circuits are fed to and inverted by inverter 49 of the same row. The inverted data is fed again to the 1st column FF in the same row as that of the read-out data. The above operation is repeated. The signal waveform is inverted for every one half frame period which covers four clock pulses. Signal corresponding to the data stored in hold circuit 45 is thus applied to the column electrodes.

A specific example will now be described. It is assumed that the display data for the 1st digit represents "2". In this case, segments b, c, e, d and h are selected from among the segments shown in FIG. 4A. The data "2" read out from buffer 23 is decoder in decoder 25, and the voltage on corresponding signal line S2 is rendered to be of active level. Conversion circuit 27 thus activates the signal lines corresponding to segments b, c, d, e and h necessary for the display of data "2". Meanwhile, signal SA is initially at "H" level. Thus, circuit 29 feeds only voltage on the signal lines corresponding to segments c, f and i to OR gates 31a to 31c. Thus, data "1" is latched in FF 33a, data "0" in FF 33b, and data "0" in FF 33c. Decoder 35 decodes input data "100" to render the voltage on signal line S1 to be of active level. Encoder 37 provides parallel data "1000" according to input data. This parallel data is converted into serial data "1000". This serial data is stored in 1st row FFs of hold circuit 45A through gate 43A1. In the above way, data corresponding to 1st digit column electrode A among the display data is stored in hold circuit 45A. Then, 2nd bit of display data is read out into buffer 23. Similar operations are performed subsequently, whereby data corresponding to signals for driving 2nd digit column electrode A are stored in the 1st row FFs of hold circuit 45A. At this time, the data stored in the 1st row FFs are transferred to the 2nd row through gate 41A2. Similar operations are also performed for the display data of the 3rd, 4th and so forth digits. Finally, data "1000" for the display of data "2" noted above is stored in the 8th row FFs.

Subsequently, signal SB goes to "H" level. 1st digit data "2" among the display data is read out again into buffer 23. At this time, signal SB is at "H" level. Therefore, circuit 29 feeds only voltage on the signal lines corresponding to segments b, e and h to OR gates 31a to 31c. Since the display data is "2", segments b, e and h are selected, and all OR gates 31a to 31c provide output of "1" level. Decoder 35 selects signal line S7, and serial data of data "0001" is fed to and stored in hold circuit 45B. Then, 2nd bit of display data is read out, and a similar operation is performed. Finally, data "0001" is stored in the 8th row FFs of hold circuit 45B. When display data for eight digits have been read out, signal SC goes to "L" level. Data corresponding to signal applied to column electrode C for each digit is stored in hold circuit 45C.

When data have been stored in hold circuits 45A to 45C, signal DISP goes to "H" level. The data stored in the hold circuits are then read out and fed to driver 47 according to clock $\phi 1$. Driver applies signals of voltage levels corresponding to the input data to the segment electrodes. The output data are inverted to be stored and provided again. As a result, a signal corresponding to data "1000, 0111" (for instance a signal which is at ground level when the data is "0" and 1.5 V when the data is "1") is applied to 1st digit column electrode A. Likewise, signal corresponding to data "0001, 1110" is applied to 1st digit column electrode B.

Figure 8:
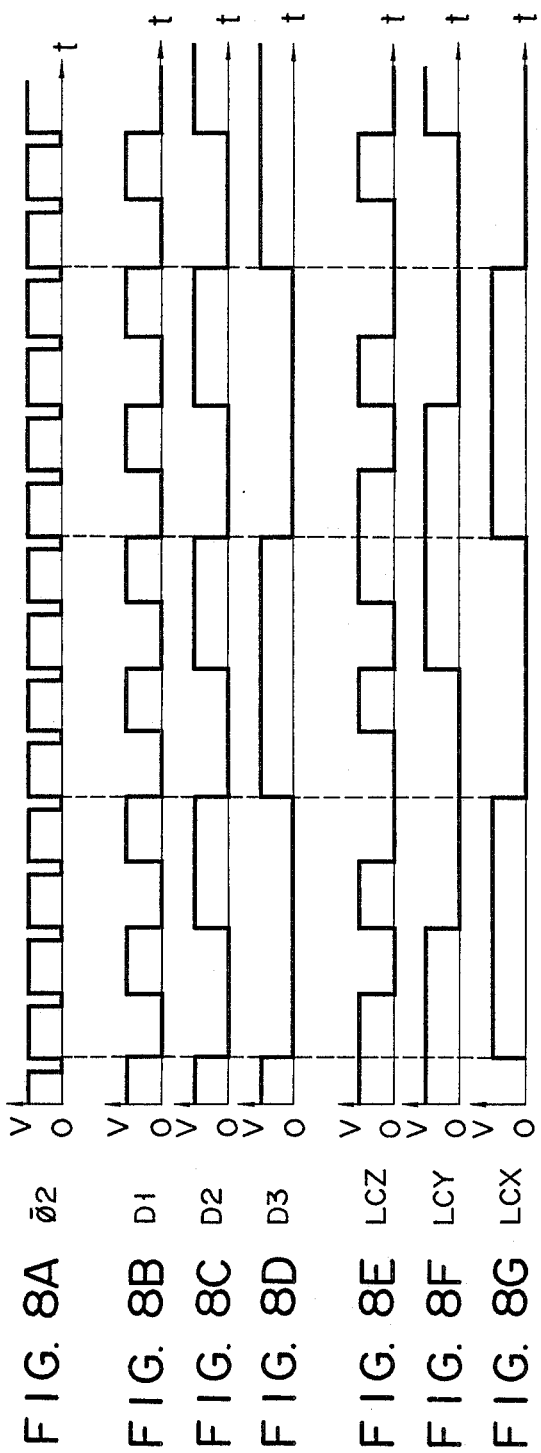

The operation of the circuit for controlling the common electrodes will now be described with reference to FIGS. 8A to 8G. Signal $\overline{\phi 2}$ obtained through inversion of clock pulse $\phi 2$, as shown in FIG. 7B, is fed to counter 61. Counter 61 counts pulses of input clock signal $\phi 2$. Thus, 1st bit output data D1 of counter 61 changes as shown in FIG. 8B, 2nd bit output data D2 changes as shown in FIG. 8C, and 3rd bit output data changes as shown in FIG. 8D. In correspondence to the above counting operation of counter 61, common signals LCX, LCY and LCZ applied to common electrodes X, Y and Z have waveforms as shown in FIGS. 8E to 8G which are inverted for every one half frame period, i.e., for every four clock pulses.

Figure 9:
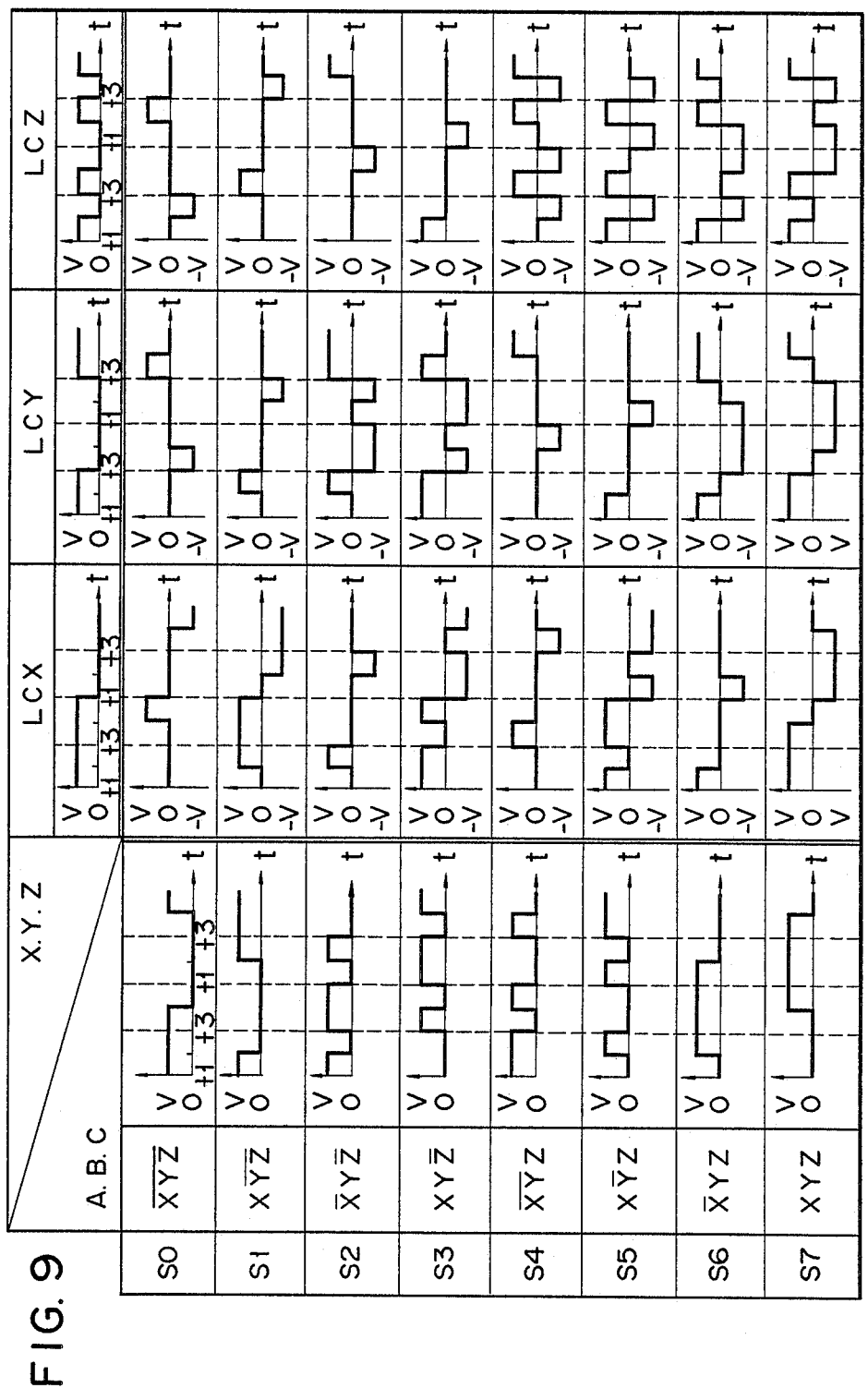
FIG. 9 is a view showing waveforms of signals applied to combination of column electrodes and common electrodes of a liquid crystal.

FIG. 9 shows voltages applied across the liquid crystal when signals LCX, LCY and LCZ are applied to the common electrodes and signals S0 to S7 are applied to the column electrodes. For example, when it is desired to cause display of only the segments corresponding to common electrode Z among the segments connected to a certain column electrode ($\overline{X}$, $\overline{Y}$, Z), signal S4 is applied to the pertinent column electrode. The voltages shown at the intersections of signals LCX, LCY and LCZ and common signals S0 to S7 are of signals applied across the liquid crystals between segment electrodes. For example, when signal S0 is applied to column electrode A, a voltage corresponding to "000V, 000 (−V)" is applied across a portion of the liquid crystal corresponding to segment c.

The waveforms of the common signals and segment signals are inverted for every four pulses of clock $\phi 1$. When the execution value of the signal applied, i.e., combinations of segment signals S2, S4 and S6 and common signal LCX, is small, the corresponding segments of liquid crystal display unit 15 are not displayed. When the execution value of the applied voltage is large such as combinations of segment signals S1, S3, S5 and S7 and common signal LCX, the corresponding segments of unit 15 are displayed.

Signals So to S7 and LCX to LCY may be selected in various combinations, and the above examples are not limitative. The waveforms of signals S0 to S7 can be selected as desired by altering the logic of encoding of encoder 37.

As has been shown, according to the invention the regulator, pulse generator and liquid crystal driver are formed integrally in a LSI. In addition, the liquid crystal element is operated with low voltage in a multi-static system to dispense with capacitors used for stepping up voltage to the liquid crystal driver circuit. Thus, so-called external components can be greatly reduced. Thus, the components can be reduced in price, and can be assembled using an automatic assembling machine. The miniaturized electronic apparatus according to the invention thus can be manufactured at a very inexpensive overall cost of manufacture.

Further, with the above structure characters or the like can be displayed on the liquid crystal display unit by applying binary signals to electrodes. Particularly the structure is effective for an electronic apparatus using as power source a solar battery, in which limitations are imposed on the output voltage.

Further, since three separate common electrodes are provided, it is possible to reduce the number of column electrodes and also reduce the number of terminals of LSI including the liquid crystal display unit and liquid crystal driver.

In the above embodiment three separate column electrodes are provided and three column electrodes are provided for each digit. This arrangement, however, is by no means limitative, and it is possible to freely select the numbers of the common electrodes and column electrodes. Further, means for generating signals to be applied to the common electrodes and column electrodes is not limited to the structure described above.

Now, a different embodiment of the liquid crystal driver 13, in which two column electrodes are provided for each digit and four common electrodes are provided for the individual digits.

Figure 10C:
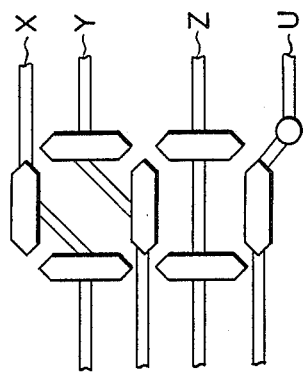
FIGS. 10A to 10C are circuit diagrams showing a modified display part of the liquid crystal display unit shown in FIG. 1.
Figure 10B:
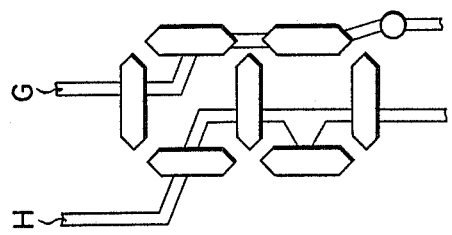
Figure 10A:
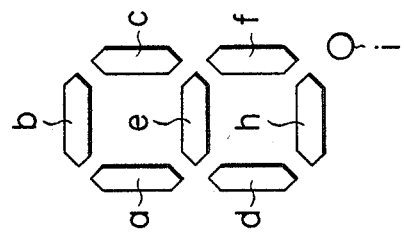

As shown in FIG. 10A, each display unit consists of seven segments a to f and h arranged in the form of figure eight. Two column electrodes G and H for each digit are connected to four segments electrodes as shown in FIG. 10B. Four common electrodes X, Y, Z and U are connected to two segments common to each digit shown in FIG. 10C.

Figure 11A:
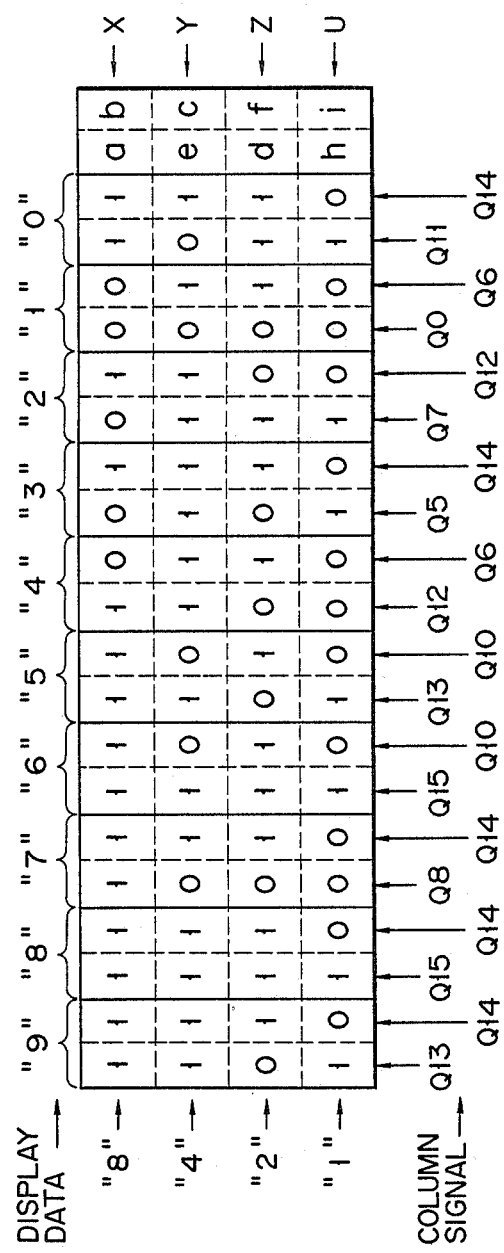
FIGS. 11A and 11B are views showing a relation between data displayed on the display part shown in FIG. 10 and data stored in a memory device and a relation between display data and signals applied to column electrodes.
Figure 11B:
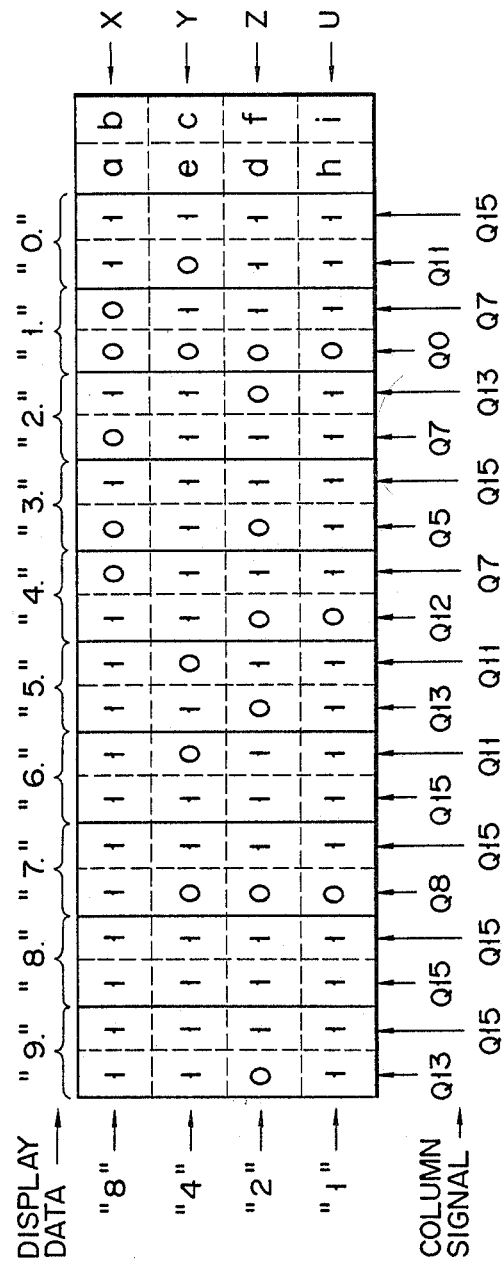

In this embodiment, the CPU converts the display data into 8-bit data as shown in FIGS. 11A and 11B, which is stored in a RAM. The CPU effects the above conversion with reference to a table stored in a ROM. Data for selecting segment electrodes b, c, f and i are stored in a memory area corresponding to column electrode G of the RAM. Data for selecting segment electrodes a, e, d and h are stored in a memory area corresponding to column electrode H. Data "1" is stored in the RAM when a corresponding segment electrode is selected, while data "0" is stored when the segment electrode is not selected. For example, when display data represents "7", segment electrodes a, b, c, f and i are selected. Therefore, data "1111" is stored in a memory area of memory device corresponding to column electrode G, while data "1000" is stored in a memory area corresponding to column electrode H.

Figure 12A:
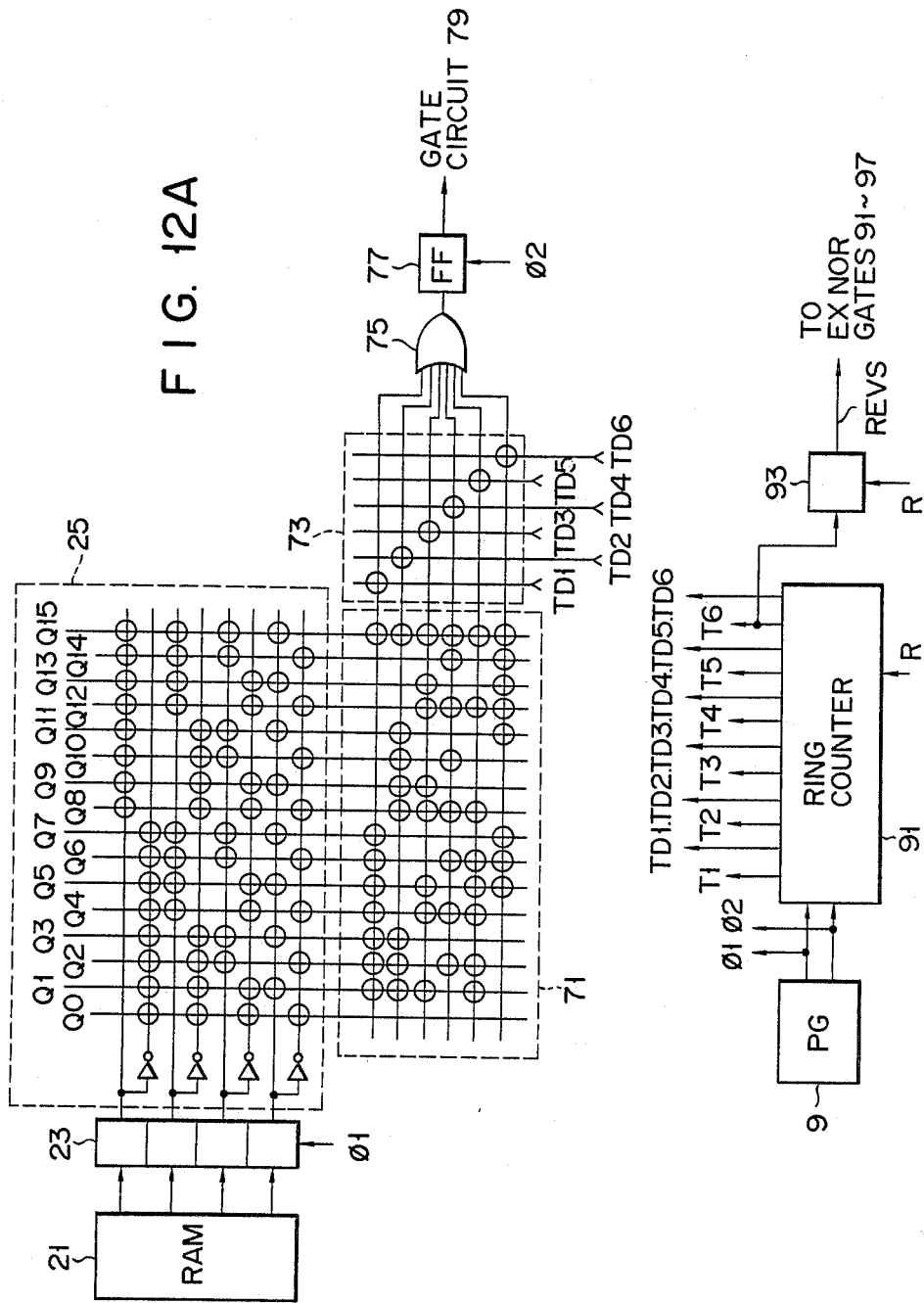
FIGS. 12A and 12B are circuit diagrams showing a modification of liquid crystal driver circuit shown in FIG. 1.
Figure 12B:
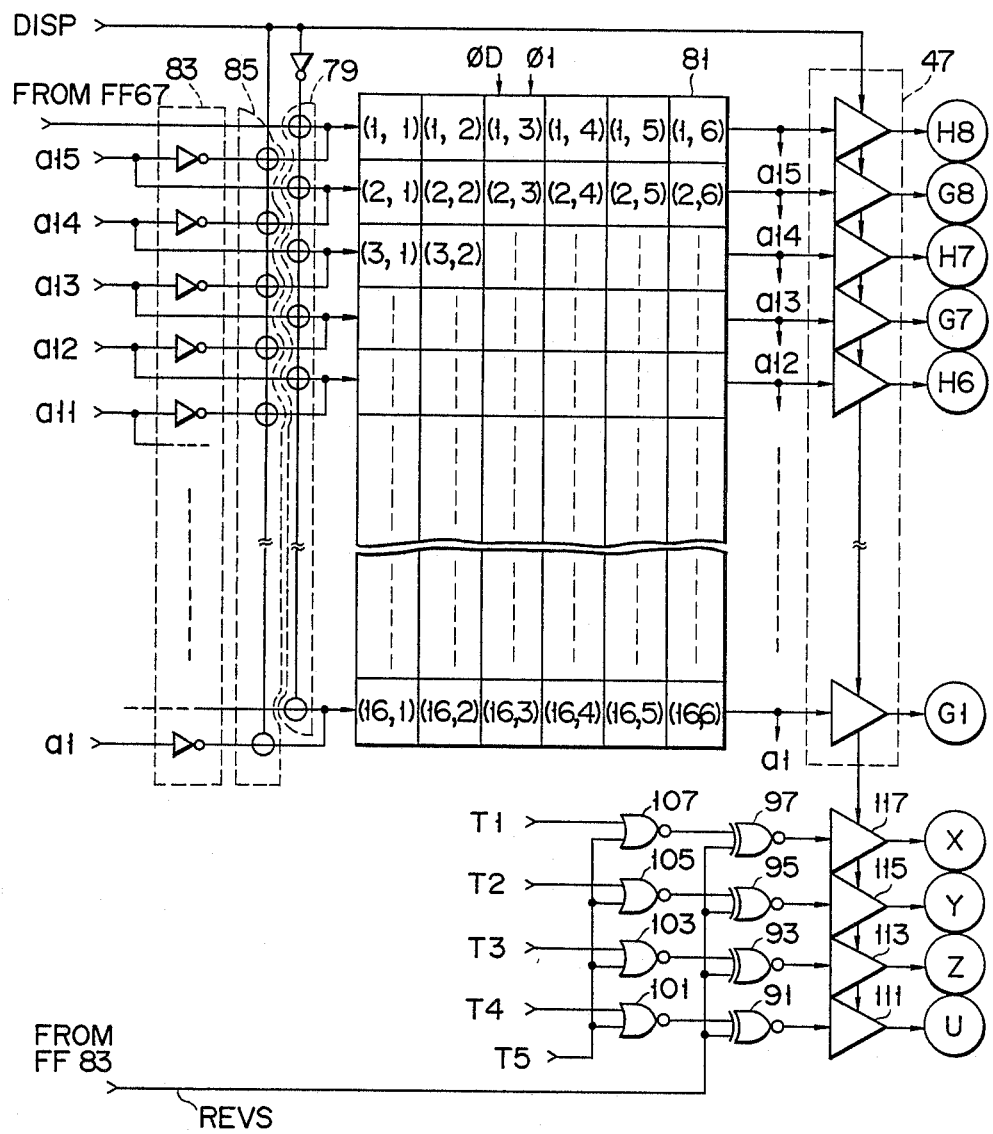

A circuit for driving the column electrodes in this embodiment having the above arrangement will now be described with reference to FIGS. 12A and 12B. In FIGS. 12A and 12B, parts like those shown in FIGS. 5A and 5B are shown by like reference numerals with omission of their detailed description.

Referring to FIGS. 12A and 12B, converted data as shown in FIGS. 11A and 11B is stored in RAM 21. RAM 21 provides 8-bit data corresponding to the display data in two distinct bit groups each of four bits. Data provided from RAM 21 is fed through buffer register 23 to decoder 25. The output signal of decoder 25 is fed to encoder 71. Encoder 71 converts the input data into 6-bit parallel data according to a predetermined logic. The predetermined logic corresponds to signals to be applied to column electrodes G and H to be described later in accordance with the display data. Timing conversion circuit 73 provides the input signals at different timings according to timing signals TD1 to TD6. These signals are converted by OR gate 75 into 6-bit serial data. This serial data is fed to FF 77. FF 77 latches the supplied data in synchronism to clock signal $\phi 2$. The output data of FF 77 is fed through gate circuit 79 to FF(1,1) of hold circuit 81.

Unlike the previous first embodiment, only a single hold circuit 81 is provided. Hold circuit 81 consists of FFs in 16 rows corresponding in number to the number of column electrodes. Hold circuit 81 consists of FFs in 6 columns corresponding in number to the number of bits of data generated from encoder 71.

Each FF latches input data in synchronism to each clock pulse $\phi D$ and provides data in synchronism to clock pulse $\phi 1$. The output of 6th column FF(i,6) is fed through gate circuit 79 to 1st column FF(i+1,1) in the next lower row. The output of 6th column FF(i,6) is fed through inverter circuit 83 and gate circuit 85 to 1st column FF(i,1) in the same row.

When signal DISP goes to "L" level, gate circuit 79 is turned on, and the output of 6th column FF(i,6) is fed to 1st column FF in the next lower row. The serial data from FF 77 thus is fed to hold circuit 81 in being unidirectionally shifted.

When signal DISP goes to "H" level, the gate circuit 85 is turned on. The output data of 6th column FF(i,6) is thus inverted in inverter circuit 83 before being fed to 1st column FF(i,1) in the same row. The output data of 6th column FF(i,6) is also fed to driver 47. Driver 47 applies voltage corresponding to the input data to column electrodes G1 to G8 and H1 to H8. Specifically, driver 47 applies signals Q0 to Q15 shown in FIGS. 14A to 14C to the column electrodes. When signal DISP is at "H" level, data is shifted through hold circuit 81. At the same time, driver 47 applies signal of voltage levels corresponding to the stored data to column electrodes G1 to G8 and H1 to H8. The data which is shifted is inverted whenever it is provided. For this reason, signals applied to the column electrodes have one frame period constituted by 12 clock pulses.

Meanwhile, clock pulses $\phi 1$ and $\phi 2$, shown in FIGS. 13A and 13B, provided from PG 9 are fed to the individual components described above. Further, clock pulses $\phi 1$ and $\phi 2$ are fed to 6-scale ring counter 91. Ring counter 91 provides timing signals T1 to T6 as shown in FIGS. 13C to 13H. Counter 91 provides signals TD1 to TD6 (not shown) obtained as a result of the delay of signals T1 to T6 by one half bit time.

Signal T6 is fed to binary counter 93 for inversion at the time of the rise of the input signal. Thus, signal REVS as shown in FIG. 13K is provided. Signal REVS is applied to EX NOR gates 91 to 97. Timing signals T1 to T4 are fed to one input terminal of NOR gates 101 to 107. Timing signal T5 is fed to the other input terminal of NOR gates 101 to 107. The outputs of NOR gates 101 to 107 are fed to the other input terminal of corresponding EX NOR gates 91 to 97. The outputs of the EX NOR gates 91 to 97 are fed to corresponding drivers 111 to 117. The outputs of drivers 111 to 117 are fed to corresponding common electrodes X to Z and U.

Ring counter 91 is initialized by receiving reset signal R when the power switch is closed.

The operation of the circuit shown in FIGS. 12A and 12B will now be described in conjunction with a specific example.

It is assumed that "2." is to be displayed on 1st digit of liquid crystal display unit 15. In this case, data "1101" and "0111" are stored in a 1st digit display data memory area in RAM 21, as shown in FIGS. 11A and 11B. As shown in FIG. 13J, 4-bit data "1101" corresponding to column electrode G for the 1st digit is read out with an address signal change. Decoder 25 decodes the data "1101" to activate line Q13. The output of decoder 25 is fed to encoder 71. Encoder 71 encodes the input data to provide parallel data "001001". Timing control circuit 73 provides 6-bit parallel data at different timings according to timing signals TD1 to TD6. The 6-bit data provided at the different timings are fed to OR gate 75. OR gate 75 thus provides serial data "001001". The serial data is fed through flip-flop 77 and gate circuit 79 to hold circuit 81. This serial data is progressively shifted in synchronism to clock signal $\phi D$ shown in FIG. 13I before it is stored. As a result, data "001001" is stored in the 1st row FFs of hold circuit 81.

With an address signal change, data "0111" stored in a memory area H corresponding to column electrode H of the 1st digit is read out, as shown in FIG. 13J. Decoder 25 thus activates signal line Q7. Encoder 71, receiving the voltage on signal line Q7 provides parallel data "100001". This parallel data is converted into 1-bit serial data. This data is stored in the 1st row FFs of hold circuit 81. The data "001001" noted above is shifted to the 2nd row.

Similar operations are also performed for 2nd and following digit display data. Finally, data "001001" is stored in the 16th row FFs of the hold circuit, and data "100001" in the 15th row FFs.

Figure 14A:
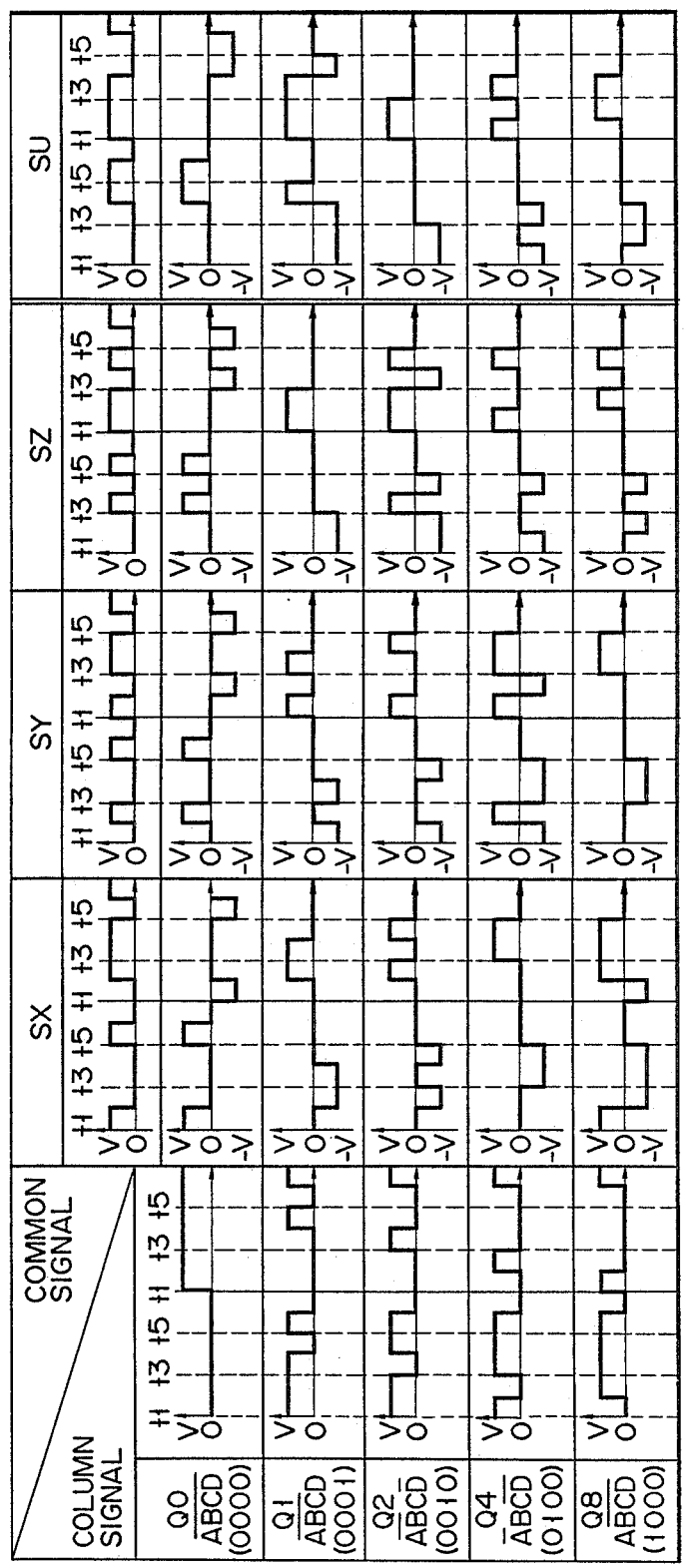
FIGS. 14A to 14C are views showing a relationship between signals applied to column electrodes and common electrodes and signals applied across the liquid crystal.
Figure 14B:
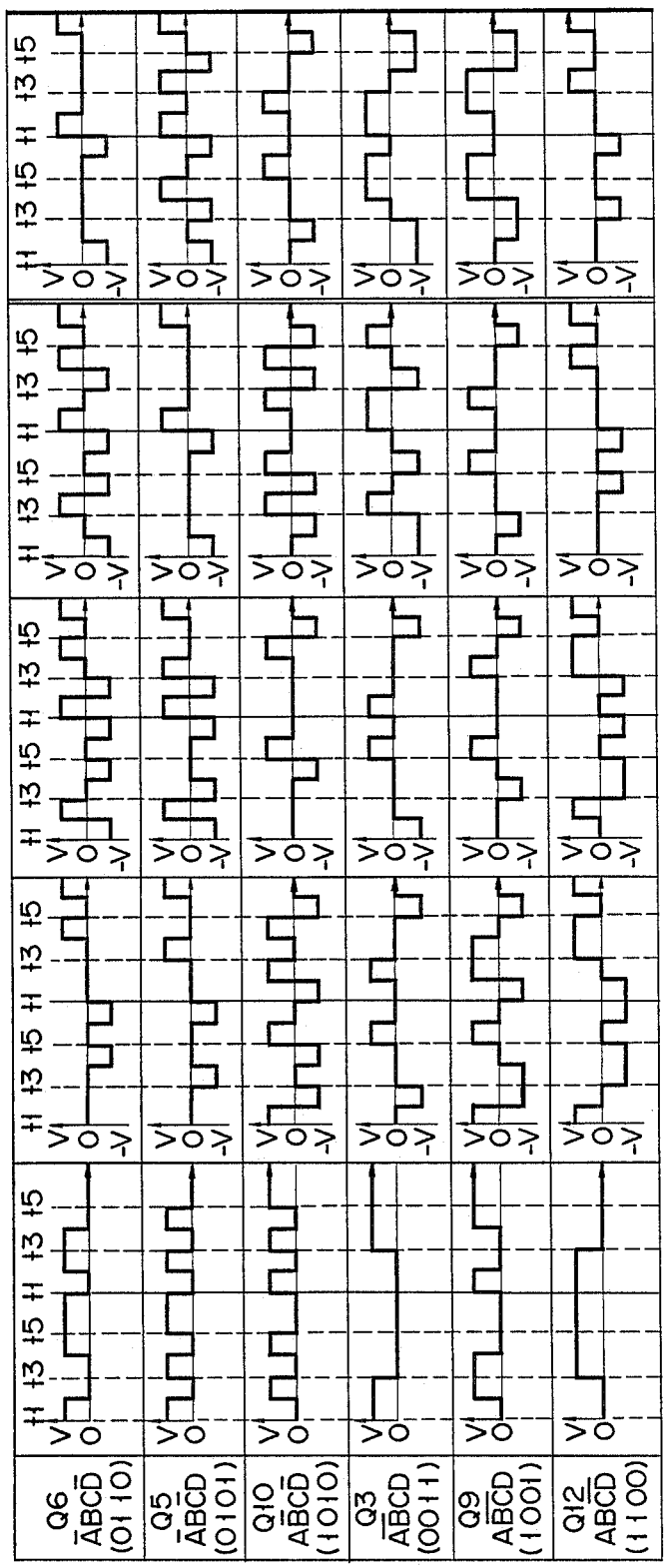
Figure 14C:
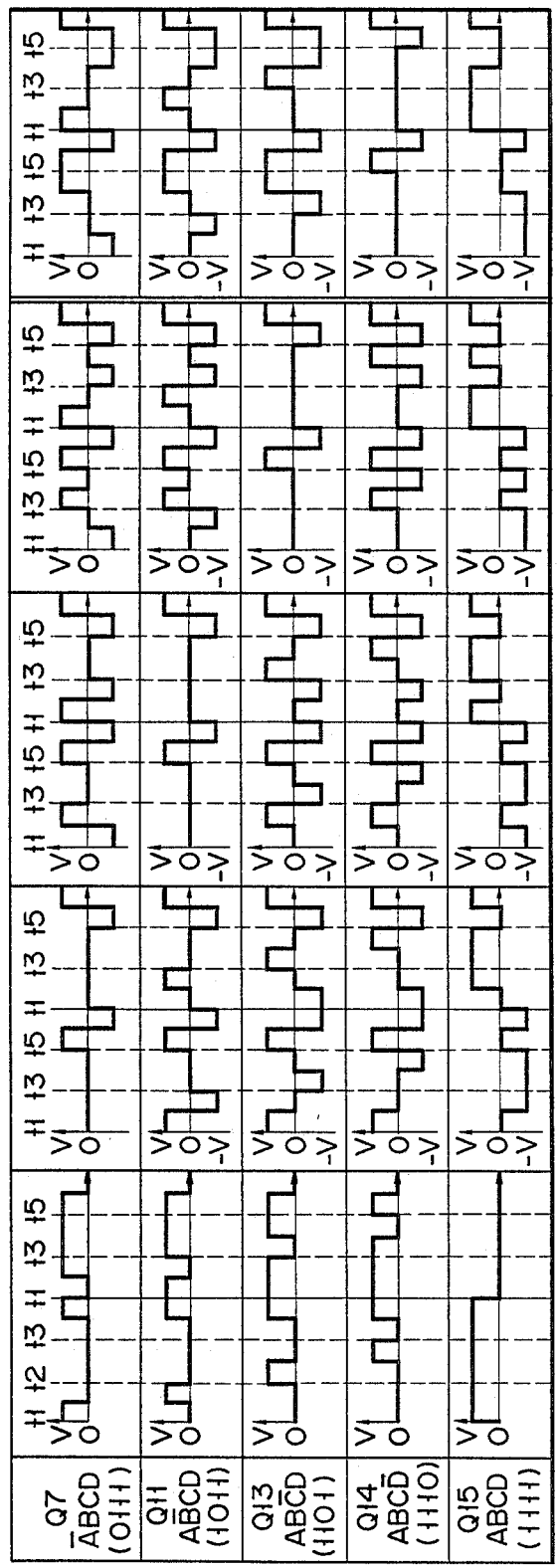

When actually applying signals to the column electrodes, signal DISP is rendered to be of "H" level. In consequence, stored data in hold circuit 81 are shifted and inverted for each row according to clock pulses $\phi D$ and $\phi 1$. The output data of hold circuit 81 is fed to driver 47. As signal corresponding to data "001001" and "11011", signal Q13 shown in FIGS. 14A to 14C is applied to 1st row column electrodes G1. Likewise, signal Q7 shown in FIGS. 14A to 14C is applied to column electrode H1.

Meanwhile, signals SX, SY, SZ and SU are applied to common electrodes X to Z and U, as shown in FIGS. 13L to 13O.

Voltages corresponding to the differences between signals SX, SY, SZ and SU and signals Q0 to Q15 are applied across the liquid crystal as shown in FIGS. 14A to 14C. Like the first embodiment, when the execution value of applied voltage is large, the corresponding segment is displayed, while when the execution value is small the segment is not displayed. As a result, segments a, b, c, d, e, g and i, representing data "2.", are displayed.

In this embodiment, like the first embodiment, it is possible to reduce the number of external components, reduce the price of the electronic apparatus and reduce the number of terminals of the liquid crystal display unit. Further, the liquid crystal can be driven using binary signals, thus simplifying the structure of the driver circuit.

In the above embodiments, three or four common electrodes are provided. However, this is by no means limitative, and it is possible to select any desired number of common electrodes to be provided. Further, the number of column electrodes provided for each display digit is not limited to 2 or 3, but it is possible to provide any desired number of column electrodes. Further, the combinations of the connection between the column electrodes or common electrodes and segment electrodes are not limited to those described before. Further, the waveforms of signals applied to the individual electrodes and their combinations are not limited to those in the above embodiments.

In the above embodiments, the individual circuit elements have been operated according to a positive logic, but this is by no means limitative, and the individual elements may be operated according to a negative logic. In this case, OR gates 41 and 75 are replaced with NAND gates and the voltages applied to the individual electrodes are inverted.

What is claimed is:

1. A liquid crystal display apparatus for providing a visible display in accordance with display data, comprising:
   a liquid crystal display panel having at least one plural digit liquid crystal display unit, said at least one liquid crystal display unit including column electrodes arranged in a plurality of separate signal lines for each digit, and common electrodes arranged in a plurality of separate signal lines which are common for all of said digits;
   means for applying common signals to said common electrodes, said common signals having two different voltage levels and a cyclic waveform having first and second half cycles, the first half of each cycle of said common signal being opposite in phase to the second half of the same cycle of said cyclic waveform; and
   means for applying column signals to said column electrodes in correspondence to display data to provide a display thereof, said column signals having two different voltage levels and a cyclic waveform having first and second half cycles, the first half of each cycle of said column signal being opposite in phase to the second half of the same cycle of the cyclic waveform of said column signals, said column signals determining a lighting pattern of segments of said column electrodes on the basis of the display data;
   said means for applying said column signals including:
     memory means for storing said display data;
     transforming means for transforming said display data into digital data corresponding to an "on-off" display pattern of segments on said column lines;
     storing means for storing said digital data, said storing means comprising shift registers, each of which have a number of bits corresponding to half of the cycle of said column signal and which are each provided for a respective one of said column electrodes, said shift registers each storing waveform data of the column signal to be applied to the corresponding column electrode;
     means for inverting data read out from said storing means;
     means for re-entering said inverted data into said storing means; and
     means for generating voltages for reading out digital data from said storing means and for supplying voltages having two different levels corresponding to said digital data to said column electrodes.

2. The liquid crystal display apparatus of claim 1, wherein:
   said common electrodes are three in number;
   said column electrodes are three in number per digit;
   said at least one liquid crystal display unit includes a plurality of segments arranged in a predetermined relation for each digit thereof for the display of said display data; and
   said means for applying said column signals selectively applies column signals including eight kinds of waveforms corresponding to respective lighting patters of said segments.

3. The liquid crystal display apparatus of claim 1, wherein:
   said common electrodes are four in number;
   said column electrodes are two in number per digit;
   said at least one liquid crystal display unit includes a plurality of segments arranged in a predetermined relation for each digit thereof for the display said display data; and
   said means for applying said column signals selectively applies column signals including sixteen kinds of waveforms corresponding to respective lighting patterns of said segments.

4. The liquid crystal display apparatus of claim 1, wherein each of said shift registers is comprised of flip-flops connected in series.

5. The liquid crystal display apparatus of claim 1, wherein:
   half of the cycle of said common signals corresponds in time to four clock pulses;
   each of said shift registers includes means for storing four-bit data; and
   half of the cycle of said column signals corresponds in time to four clock pulses.

6. The liquid crystal display apparatus of claim 2, wherein:
   half of the cycle of said common signals corresponds in time to six clock pulses;
   each of said shift registers includes means for storing six-bit data; and half of the cycle of said column signals corresponds in time to six clock pulses.

7. The liquid crystal display apparatus according to claim 1, wherein said means for applying column signals includes:
   means for connecting the output of each of said shift registers to the input of a respective one of said shift registers;
   said transforming means, which includes means for serially generating digital data;
   said storing means, which includes means for serially storing said digital data supplied via said connecting means while shifting in an order based on the arrangement thereof; and means for interrupting a connection established by said connecting means in response to an instruction, and for rendering said re-entering means active.

8. The liquid crystal display apparatus of claim 1, which further comprises:
a solar battery;
a regulator including means for receiving the output voltage of said solar battery and means for stabilizing the input voltage;
a pulse generator for providing a clock pulse signal; and
a CPU operable with the output voltage of said regulator and said clock pulse signal;
said regulator, pulse generator, means for applying said column signals and means for applying said common signals being formed in a single chip LSI.

9. The liquid crystal display apparatus of claim 1, wherein said storing means includes a respective shift register for each column electrode, the respective shift registers each holding a wave form of one half cycle of a signal which is to be applied to the corresponding column electrode.

10. The liquid crystal display apparatus of claim 9, wherein said shift registers each deliver the data stored therein as serial data.

* * * * *

UNITED STATES PATENT AND TRADEMARK OFFICE
CERTIFICATE OF CORRECTION

PATENT NO. : 4,806,923
DATED : February 21, 1989
INVENTOR(S) : T. Yanai et al

It is certified that error appears in the above-identified patent and that said Letters Patent is hereby corrected as shown below:

In the title page of the patent, under the heading, "Foreign Application Priority Data", delete "Nov. 22, 1985 [JP] Japan....60-263026".

Signed and Sealed this

Eighth Day of August, 1989

*Attest:*

DONALD J. QUIGG

*Attesting Officer*   *Commissioner of Patents and Trademarks*